United States Patent [19]
Bjorkman

[11] 3,773,560
[45] Nov. 20, 1973

[54] CIRCULATION OF ELECTROLYTE OVER A METAL ELECTRODE OF A CELL IN A HIGH ENERGY DENSITY BATTERY

[75] Inventor: Harry K. Bjorkman, Birmingham, Mich.

[73] Assignee: Occidental Energy Development Company, Whitcomb, Madison Heights, Mich.

[22] Filed: Nov. 18, 1971

[21] Appl. No.: 200,068

[52] U.S. Cl.............................. 136/86 R, 136/86 E
[51] Int. Cl...................... H01m 31/00, H01m 27/12
[58] Field of Search............... 136/86 A, 86 S, 86 E, 136/86 R, 162, 163; 204/257, 269, 275

[56] References Cited
UNITED STATES PATENTS
3,513,032  5/1970  Warszawski ........................ 136/160

*Primary Examiner*—A. B. Curtis
*Assistant Examiner*—H. A. Feeley
*Attorney*—William J. Schramm

[57] ABSTRACT

A cell of a high energy density secondary battery, such as one having zinc and chlorine-on-carbon electrodes and a separator dividing the cell electrolyte portion into a smaller flow zone adjacent to the zinc electrolyte and a larger flow zone adjacent the chlorine-on-carbon electrolyte, includes a common outlet from both cell portions of such a structure that the flow of electrolyte through the larger cell zone helps to determine the rate of flow through the smaller zone. In preferred embodiments of the apparatus the same electrolyte is circulated to both zones by a single pump or driving means, the flow in the smaller zone is such as to cause a desirable circulation of electrolyte therein at a low speed which is still sufficient to prevent polarization at the zinc electrode and pitting and dendritic formations on it, and the rate of flow through such lesser flow zone is regulated by having the outlet from such zone communicate with a restricted portion of a Venturi or equivalent orifice in the main flow zone outlet passage.

6 Claims, 2 Drawing Figures

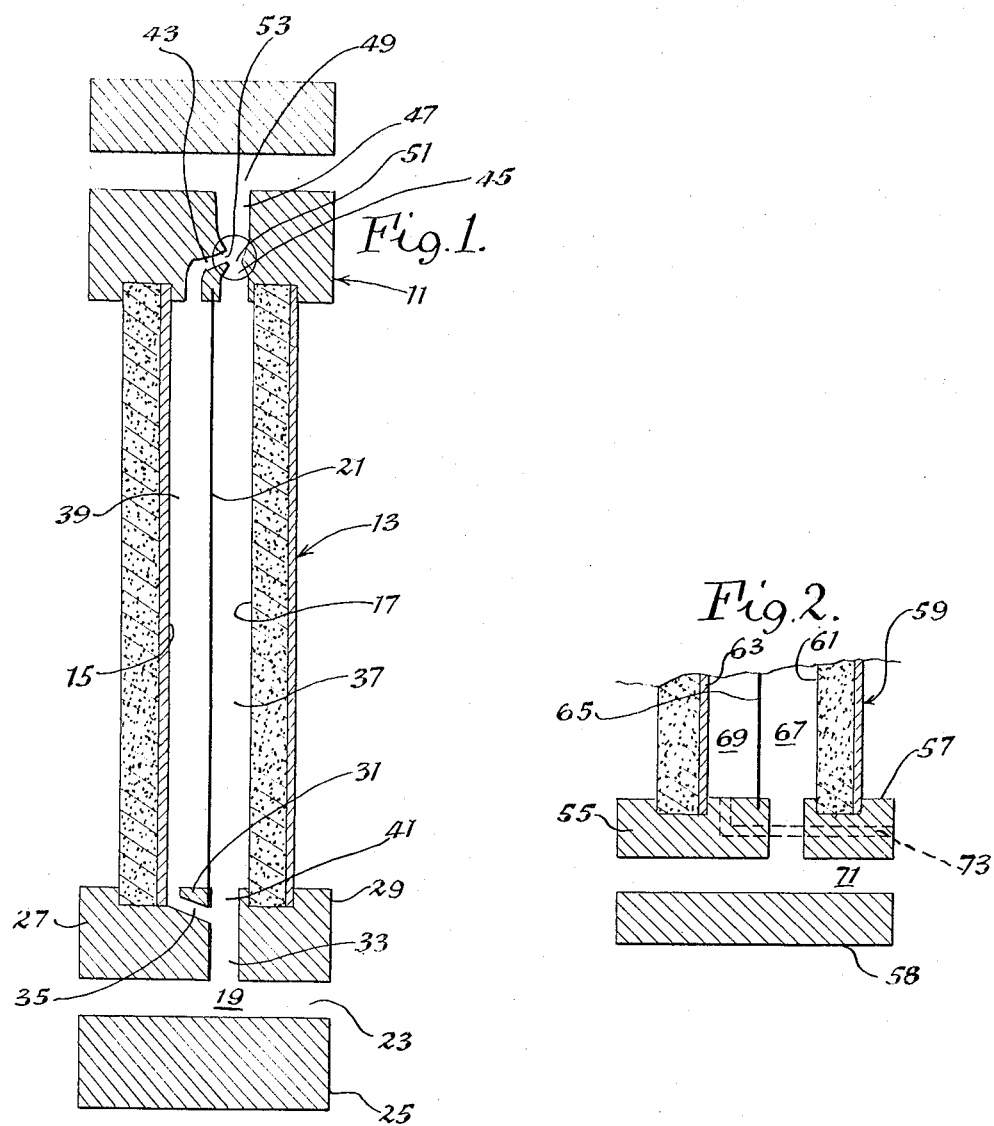

CIRCULATION OF ELECTROLYTE OVER A METAL ELECTRODE OF A CELL IN A HIGH ENERGY DENSITY BATTERY

BACKGROUND OF THE INVENTION

High energy density batteries such as those having a highly electropositive metal on a suitable base, as the cathode and a halogen, usually on a carbon base, as the anode, with an aqueous metal halide electrolyte between them, have been known in the art. It has also been known to utilize a separator, usually of the membrane or diaphragm type, between the electrodes, which separator functions to divide the electrolyte zone of the cell into sub-zones through which electrolyte flows, usually from bottom to top. During the charging cycle zinc is plated out on the cathode and chlorine is generated at the anode, while during discharge chlorine dissolved in aqueous zinc chloride electrolyte is circulated past the anode and zinc is dissolved back into electrolyte at the cathode. It has been noted that in the absence of a separator or means for preventing chlorine from directly contacting the zinc electrode, inefficient reactions at the electrode occur and the zinc sometimes becomes pitted and dendrites form thereon, due to polarization effects. These interfere with the smooth production of electricity during discharge and are to be avoided. For this reason, separators have been used to prevent contact of the chlorine with the zinc. Such separators permit flow rates to be adjusted as desired by regulating separate pump speeds and normally the flow rate in the zone adjacent to the zinc electrode will be less than that in the other zone. Volumes of the zones may be equal or in some cases, the volume of the zone adjacent to the metal electrode may be greater than the other but in both charging and discharging operations the flow rate in this portion of the cell is desirably less than in the chlorine portion and normally its volume will also be less.

In the chlorine sub-zone it is important to have good circulation so as to maintain an intimate contact of the chlorine gas with the electrode base surface whereas such contact is generally readily obtainable at the zinc electrode and no special efforts need be made to effect it. In fact, low flow rates are considered to be desirable.

Also, the use of separate pumps to regulate separate electrolyte flows in the different cell zones adds additional expense, weight and volume to the high energy density secondary batteries made from banks of the present cells and often does not allow best proportioning of flow rates in the sub-zones.

SUMMARY OF THE INVENTION

By the method of the present invention a small proportion of flowing electrolyte is passed over an electrode of a cell of a high energy density secondary battery having a pair of electrodes and a separator in an electrolyte zone between them, dividing such zone into greater and lesser electrolyte flow subzones, during charging or discharging of such battery, electrolyte is flowed to both electrolyte sub-zones of the cell and out of the cell through a common outlet, with the flow rate of electrolyte through the greater flow sub-zone controlling the flow through the lesser flow sub-zone by changing the pressure differential between low flow sub-zone inlet and outlet, such changing increasing and decreasing the differentials and the rates of flow through the lesser flow sub-zone directly proportionally with increases and decreases in the rates of flow in the greater flow sub-zone.

In an apparatus for carrying out the invention, the described cell, divided by a separator therein, includes means for feeding electrolyte, preferably from a common source, to inlets to both sub-zones, with from 75 to 98 percent of the flow being in one sub-zone and 2 to 25 percent of the flow being in the other subzone, which means include an inlet manifold for flowing electrolyte to a plurality of such cells, an inlet passageway for conducting electrolyte from the inlet manifold to the greater flow subzone through which the larger proportion of electrolyte flows, and a smaller inlet passageway, communicating the smaller flow sub-zone with said inlet passageway or with the inlet manifold, an outlet flow manifold, an outlet passageway communicating said outlet manifold with the greater electrolyte flow sub-zone and a smaller outlet passageway communicating the lesser electrolyte flow sub-zone with the outlet passageway, in such disposition that flow of electrolyte through the greater flow sub-zone carries with it electrolyte from the lesser flow sub-zone so as to cause a desirable circulation of electrolyte in the lesser flow subzone.

In the most preferred embodiments of the invention the rate of flow in the lesser flow sub-zone is regulated by having an outlet passageway from said zone communicate with a restricted portion or Venturi throat of an outlet from the greater flow subzone so that a pressure differential is created to influence the flow through the lesser sub-zone, the flow rate being increased or decreased when flow in the greater flow rate sub-zone is increased or decreased, respectively.

DESCRIPTION OF THE PREFERRED EMBODIMENTS

The present invention and its mode of operation will be apparent from the following description, taken in conjunction with the accompanying drawing, in which:

FIG. 1 is a central vertical sectional view of a cell of the present invention, illustrating passage of a common electrolyte through the electrolyte sub-zones thereof; and FIG. 2 is a view of a modification of some structure of FIG. 1 in which electrolytes of different compositions are separately flowed through the cell sub-zones.

Referring to FIG. 1, the cell 11 of a high energy density secondary battery comprises bipolar electrodes 13 having zinc cathodes 15 and carbon bases 17 for chlorine-on-carbon anodes. Electrolyte 19 flows through said cell from bottom to top, divided by separator 21 after it passes from manifold 23 between frame 25 and supports 27, 29 and 31. As is illustrated, the electrolyte passes from a source thereof, not illustrated, through an inlet flow manifold 23, inlet passageway 33 and smaller inlet passage 35, which divide it into two portions, a greater flow passing into greater flow sub-zone 37, adjacent the chlorine-on-carbon electrode and a lesser flow into sub-zone 39, which is between the separator and the zinc face of an electrode of the cell.

Because the flow in the greater flow sub-zone (hereafter called the chlorine zone) is desirably high, so as to intimately make contact between the electrolyte therein and the carbon base for the chlorine-on-carbon electrode, passage 33 and the extension thereof 41 will be greater in cross-sectional area than passage 35. Greater flow is desired in zone 37 because during discharging operations it is desired to maintain chlorine gas in intimate contact with the electrode base and during charging operations the chlorine should be washed off the base as quickly as possible. Such actions are aided by high rates of electrolyte flow past the electrode base surface. On the other hand, circulation past the zinc electrode is desirably low. It is not feasible to have the electrolyte stagnant but for both charge and discharge cycles a minor rate for electrolyte, with respect to the other sub-zone, is highly favored. Usually this will be from 2 to 25 percent, preferably from 2 to 10 percent of the total electrolyte flow. Such a flow rate, usually equal to a linear velocity of 0.1 to 10 cm./second, has been found to be sufficient to deosit zinc on the electrode during the charging operations and to allow it to dissolve therefrom during discharge, without unduly restricting charging or discharging rates. Preferably, the cross-sections of passageways 35 and 41 will be in proportion to the flow rates.

In a similar manner, the output passageways 43 from the zinc zone and 45 from the chlorine zone will be sized so that the chlorine zone outlet will be larger. These communicate in combined outlet passage 47, which opens into exit manifold 49. In passage 45 between chlorine zone 37 and combined outlet 47 there is desirably included a restriction or Venturi throat 51 into which passage 43, opens at "inlet" 53. At such inlet point the cross-sectional area of the smaller outlet passage will prefrably be about proportional to the flow rates through the different passageways, as compared to the cross-sectional area of the larger passage at the restriction. When the electrolyte flowing through the chlorine zone passes the restriction an area of low pressure will be created, which will help to pull electrolyte through the zinc zone and out the exit passageway. Thus, by regulating the sizes of the openings to the Venturi or a similar orifice or restriction in the chlorine exit passage, the force or vacuum exerted on the fluid in the zinc sub-zone may be changed to provide the desired flow rate of electrolyte through it.

In the described embodiments of the invention the flow is of a common electrolyte which is divided to pass through the zinc and chlorine zones and then is reunited before being returned to the manifold. After entry to the manifold the electrolyte may be resaturated with either chlorine or zinc chloride, as may have been depleted in the cell, and may be returned through inlet manifold 23 for continued cell operation.

During charging of the cell the zinc chloride electrolyte deposits zinc on the zinc electrode and has chloride ion converted to chlorine at the other electrode, so the electrolyte charged to both sides should desirably be the same. However, during discharging operations, chlorine dissolved in aqueous zinc chloride electrolyte is circulated to the chlorine zone but most desirably, the electrolyte in contract with the zinc electrode should not have chlorine in it, or, if present, the chlorine content should be as low as feasible. Thus, an electrolyte inlet of the type shown in FIG. 2 may be employed when the battery is discharging.

In FIG. 2 base or frame 58 and holding elements 55 and 57 position bipolar electrodes 59 having chlorine-on-carbon anodes 61 and zinc cathodes 63 divided by a separator 65 so as to form plural zones or sub-zones 67 and 69, known as the chlorine and zinc zones, respectively. Inlet manifold 71 allows the flow to the chlorine side of electrolyte containing dissolved chlorine, while inlet 73 provides for circulation of an electrolyte lower in dissolved chlorine to the zinc side of the cell. Sizes of the inlet passageways and restrictions in them at the inlets may be controlled to provide desired flow rates, which will usually be about the same proportionally as those previously described. The outlets from cells of this design may be the same as those of FIG. 1, because there is no objection to the electrolytes being combined after passage through the cell. This is so because, the normally chlorine-rich electrolyte entering chlorine zone 67 will be depleted in chlorine content when it leaves the cell.

Although various sizes of cells may be utilized, since the Venturi effect can be adjusted accordingly, normally these cells will have a size such that the electrode surface areas will be about 50 to 500 square centimeters, each, and the total cell volumes will be from about 10 to 200 c. cm. The outlet passageways will generally be from 0.05 to 1 sq. cm. for the chlorine zone and 0.01 to 0.2 sq. cm. for the zinc zone. The Venturi restriction will normally be to a cross-sectional area about one-half to one-eighth that of the outlet passageways.

An important advantage of the present invention is in the provision of a regulatable flow through the zinc zone of the cell without the need for an additional pump to control this. Even in the embodiment of the invention of FIG. 2 where separate electrolyte charges are utilized, the feed of electrolyte to the zinc side may be gravity fed with the control of flow being regulated by the suction created in the chlorine side Venturi. Thus, only a single pump is needed for the battery. The materials of construction suitable for use in these cells and for molding the passages and restriction(s) in them are resistant to zinc chloride solutions and to chlorine and are readily available. Such materials include chlorinated rubber, phenol-formaldehyde, polyethylene, polypropylene, PVC (preferred), chlorinated polyvinyl chloride, polytetrafluoroethylene and chlorinated poly-lower alkylenes. These plastics and rubbers may also be used for the separator but generally a polytetrafluoroethylene-on-cloth membrane or one of similar properties or type is preferred.

In use, it is found that the described structure allows the regulation of flow of electrolyte over the zinc electrode in such manner that cavitation, pitting, dendrite formation and polarization are prevented or are significantly decreased, compared to operation of a cell without the separators and controlled flow of electrolyte. To obtain best flows the pressure in the inlet port is higher than that of the exit from the chlorine zone before the Venturi restriction and the pressure at the outlet from the zinc zone is greater or equal to the pressure at the outlet from the chlorine zone, with both pressures being greater than that in the combined passageway before the exit manifold. Such a pressure relationship is obtained when using the present structures and desired flow control is maintained. No backing up of the electrolyte or undesirable mixings before entry into the restriction or Venturi are noted. Of course, instead of the restriction or Venturi at this point, the flow from the zinc side may be led into the discharge passageway from the chlorine side and some control of flow may thus be obtained but it will be inferior to that available when a Venturi-type restriction is employed. In its broadest aspect the present invention contemplates such a construction or others in which a single pump or other means for electrolyte flow through the cell is utilized to supply electrolyte to both sides of the separator therein.

The various high energy density electrodes, cells and batteries in which the present invention may be employed, and the materials of construction and operations thereof, in addition to such already disclosed in this application, may be found in or adapted from the descriptions in U.S. Pat. application Ser. No. 50,054 for Process for Electrical Energy Using Solid Halogen Hydrates, now U.S. Pat. No. 3,713,888 and in a U.S. patent application entitled BIPOLAR ELECTRODE FOR CELL OF HIGH ENERGY DENSITY SECONDARY BATTERY, filed on the same day as this application and identified as Ser. No. 200,041. The invention may also be utilized when the metal electrode is not replated but rather, is replaced or the battery is "refuelled." Of course, the structure is not limited to use with any particular battery system and may also find use with such other different batteries as the zinc-air, zinc-bromine and zinc-oxygen batteries, among others, in which it may be desired to feed electrolyte comparatively slowly past one of the electrodes.

The following examples illustrate the invention but do not limit it. All parts are by weight and all temperatures are in ° C., unless otherwise indicated.

EXAMPLE 1

A cell, designed for use in a high energy density battery, is constructed of a phenol formaldehyde framework, bi-polar zinc on graphite and porous carbon electrodes, a polytetrafluoroethylene-on-cloth membrane separator and flow control passageways in the base material and associated with the separator. Although in some embodiments of the invention the cell and the battery are discharged by passing chlorine through a porous carbon electrode and the same effects are obtained as in the cells of the present example, the embodiment of the invention described herein is one wherein the electrolyte containing dissolved chlorine is circulated in contact with the "outer" surface of the porous carbon electrode. The graphite is not separately illustrated in the drawing but may be considered to be a side of the porous carbon electrode or the porous carbon may be made impervious on each side.

The electrode face area is about 170 square centimeters and the cell internal volume is about 22 cubic centimeters. The cell volume is divided into two approximately equal parts by the vertical polytetrafluoroethylene-on-cloth diaphragm or separator which is maintained out of contact with both electrodes. The interior of the cell communicates with manifolds for connecting it to other cells and the cell design is illustrated in FIG. 1.

The electrolyte temperature is about 30° C. and the electrolyte flow rates are about 600 milliliters per minute on charge and 400 mls minute on discharge. About 10 percent of the electrolyte is designed to flow through the zinc zone and 90 percent through the chlorine or carbon zone. Thus, the linear velocity through the carbon zone will be about 6 cm./second and that through the zinc zone will be about 0.6 cm./second.

To obtain the desired flow rates the inlet and outlet passageways will have cross sectional areas proportional to the flow rates. Inlets will be about 0.5 sq. cm. and 0.05 sq. cm., respectively, as will be the outlets. Additionally, the small outlet, where it communicates with the Venturi, will be appropriately narrowed to the 0.05 sq. cm. area or less and the outlet will be narrowed to about half its area at the Venturi throat. Such a design results in the desired flow rates at the feeds utilized for the present cells.

The described cells, containing a 400 micron thickness of zinc on a graphite base which is about a millimeter thick and which is attached to porous carbon about five times as thick, is discharged to produce an open circuit voltage of 2.1 volts and a working voltage of 1.7 volts at 8 amperes by flowing into the cell at the mentioned volumetric rate at 15% zinc chloride solution (at start of discharge) containing about 3 grams per liter of dissolved chlorine. About 10 percent of the flow passes through the zinc electrode portion of the cell. Charging of the cell is completed in about 1.5 hours and after charging, it is noted that the zinc is evenly depleted from the electrode, leaving no gross irregularities on the surface thereof.

In a comparable operation of a battery without the diaphragm mentioned and without the proportional flow regulation of this invention, noticeably more pitting and irregularities in the removal of zinc result. Similar conditions become evident during the charge cycle, in which case the zinc dendrites are formed when operations are without the controlled separated flow.

In modifications of this experiment, the ratios of flows are altered and from 2 to 25% of the electrolyte flows through the zinc portion of the cell. It is considered that the operation at 10 percent is best since it is readily controlled and does not bring too much chlorine into contact with the zinc.

EXAMPLE 2

The procedures of Example 1 are followed except for the introduction of a separate charge of electrolyte to the zinc portion of the cell, said electrolyte containing no dissolved chlorine. The pressure head on this electrolyte is regulated to be similar to that in the inlet manifold so that the Venturi suction effect (obtained due to the relationships of the passageways in the circled portion of the cell, illustrated in FIG. 1), causes the same proportionate flows to be obtained as in Example 1. Although differences in errosion and dendrite formation on the zinc electrode are not great, it is considered that operation by the method of this example results in a zinc electrode superior to that of FIG. 1. However, the provision of a separate electrolyte source and means for regulating flow head may be impractical in some cases and therefore, for reasons of cost and size, the apparatus of FIG. 1 is often preferred.

When either of the embodiments of FIG. 1 or FIG. 2 of the drawing is utilized in cell stacks or batteries, flowing the electrolyte through the manifold inlets and outlets to serve all the cells of the stack or battery, results obtained are essentially the same as those for operating individual cells. Although flow rates through the cells are varied, the ratios of flows between the zinc and chlorine portions of the cells remain essentially the same. However, in cases where changes in flow rates require changes in such ratios, these can be readily obtained by enlargements or partial blockings of passageways to the Venturi throat from the zinc zone. Some such effects are also obtained by variations in the proportions of inlet passageways areas.

The invention has been described with respect to illustrations and examples thereof but it is clear that it is not to be limited to these because equivalents may be substituted for elements or steps in the invention without departing from the spirit of the invention or going beyond its scope.

What is claimed is:

1. A cell apparatus for a secondary battery having an inlet manifold means and an outlet manifold means comprising an anode and a cathode being spaced apart, an electrolyte zone between the anode and cathode through which electrolyte may flow, a separator between the anode and cathode, thereby providing an electrolyte anolyte sub-zone near the anode and an electrolyte catholyte sub-zone near the cathode, means for feeding electrolyte from a common source through the cell inlet manifold means to both sub-zones and out the cell outlet manifold means a first valveless inlet passageway means for conducting electrolyte from the cell inlet manifold means to the catholyte sub-zone and a second valveless inlet passageway means being smaller in size than the first inlet passageway means, for conducting electrolyte from the cell inlet manifold means to the anolyte sub-zone, a first valveless outlet passageway means, communicating said cell outlet manifold means with the catholyte sub-zone and a second valveless outlet passageway means, communicating the anolyte sub-zone with the cell outlet manifold means, said passageways being of such dimensions that from 75 percent to 98 percent of the flow being in the catholyte sub-zone and 2 percent to 25 percent of the flow being in the anolyte sub-zone, said second outlet passageway means being smaller in size than the first outlet passageway means, thereby creating a venturi effect so that flow of electrolyte through the catholyte sub-zone carries with it electrolyte from the anolyte subzone so as to cause a desirable circulation of electrolyte through the anolyte sub-zone.

2. A cell according to claim 1 wherein the separator is a synthetic organic polymeric plastic membrane and the sizes of the second inlet and outlet passageways are such as to maintain from 2 percent to 10 percent of the flow of the electrolyte through the cell passing through the anolyte sub-zone of the cell.

3. A method of passing a small proportion of flowing electrolyte over an electrode of a cell of a high energy density secondary battery having a pair of electrodes and a separator in an electrolyte zone between them, dividing such zone into greater and lesser electrolyte flow sub-zones, during charging and discharging of such battery, which comprises flowing electrolyte to both electrolyte sub-zones of the cell, flowing the electrolyte passing through said sub-zones out of the cell through a common outlet, with the flow rate of electrolyte through the greater flow sub-zone controlling the flow through the lesser flow sub-zone by changing the pressure differential between the lesser flow sub-zone inlet and outlet, such changing increasing the differential and the rate of flow through the lesser flow sub-zone directly with increases in the rate of flow in the greater flow sub-zone.

4. A method according to claim 3 wherein the electrolyte is aqueous zinc chloride solution which has dissolved chlorine therein during discharge of the cell, the electrode of the lesser flow sub-zone is zinc and that of the greater flow sub-zone is chlorine-on-carbon, the electrolyte flows through the zones are 2 to 25 percent and 75 to 98 percent and the flow through the lesser sub-zone is regulated by maintaining the pressure at the outlet therefrom equal to that of the electrolyte exiting from the greater flow sub-zone at the narrowest portion of a Venturi-type restriction in the greater flow sub-zone outlet.

5. A method according to claim 4 wherein the cross-sections of the sub-zones of electrolyte, in conjunction with the pressures on such electrolyte portions, are such as to provide from 2 to 10 percent of the flow of electrolyte in the cell through the smaller flow sub-zone so as to maintain a small but sufficient circulation of electrolyte past the zinc electrode to prevent polarization thereat and to prevent pitting and dendritic formations thereon.

6. A method of passing a small proportion of electrolyte over an electrode of a cell of a high energy density secondary battery having a pair of electrodes and a separator in an electrolyte zone between them, dividing such zone into greater and lesser electrolyte flow sub-zones, during charging of such battery, which comprises flowing electrolyte saturated with gaseous chlorine to the greater electrolyte flow sub-zone, between the separator and a chlorine-on-carbon electrode, and electrolyte containing no elemental chlorine or a lesser proportion thereof into and through the lesser electrolyte sub-zone between the separator and a zinc electrode, flowing the electrolytes passing through said sub-zones out of the cell through a common outlet, with the flow rate of electrolyte through the greater flow sub-zone controlling the flow rate through the lesser flow sub-zone and changing the pressure differential between the lesser flow sub-zone inlet and outlet, such changing increasing the differential and the rate of flow through the lesser flow sub-zone directly with an increase in the rate of flow in the greater flow sub-zone, and correspondingly, decreasing the differential and the rate of flow through the lesser flow sub-zone when the flow rate in the other sub-zone is decreased.

* * * * *